United States Patent
Jung (10) Patent No.: US 8,842,075 B2
(45) Date of Patent: Sep. 23, 2014

(54) APPARATUS AND METHOD FOR DISPLAYING SYMBOLS ON A TERMINAL INPUT AREA

(75) Inventor: Jang Jae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1188 days.

(21) Appl. No.: 12/103,230

(22) Filed: Apr. 15, 2008

(65) Prior Publication Data

US 2008/0259047 A1    Oct. 23, 2008

(30) Foreign Application Priority Data

Apr. 17, 2007  (KR) .................... 10-2007-0037208

(51) Int. Cl.
- *G06F 3/041* (2006.01)
- *H04M 1/23* (2006.01)
- *H04M 1/22* (2006.01)
- *H04M 1/26* (2006.01)

(52) U.S. Cl.
CPC ............ *H04M 1/23* (2013.01); *H04M 2250/22* (2013.01); *H04M 1/22* (2013.01); *H04M 1/26* (2013.01)
USPC ............ 345/173; 200/310; 200/600; 341/22; 345/170

(58) Field of Classification Search
USPC ............ 345/168–179; 200/310, 600; 341/22
See application file for complete search history.

(56) References Cited

U.S. PATENT DOCUMENTS

| | | | | |
|---|---|---|---|---|
| 4,479,112 A | * | 10/1984 | Hirsch | 380/52 |
| 4,543,631 A | * | 9/1985 | Kurosu et al. | 715/234 |
| 6,020,881 A | * | 2/2000 | Naughton et al. | 715/740 |
| 2004/0221243 A1 | * | 11/2004 | Twerdahl et al. | 715/834 |
| 2005/0024340 A1 | * | 2/2005 | Bathiche | 345/170 |
| 2005/0140657 A1 | * | 6/2005 | Park et al. | 345/169 |
| 2005/0272475 A1 | * | 12/2005 | Hahn | 455/566 |

FOREIGN PATENT DOCUMENTS

| | | |
|---|---|---|
| CN | 1627764 | 6/2005 |
| CN | 1661538 | 8/2005 |
| KR | 10-2006-0008454 | 1/2006 |
| KR | 10-0606803 | 8/2006 |
| KR | 10-2007-0037548 | 4/2007 |
| KR | 10-2007-0037549 | 4/2007 |

OTHER PUBLICATIONS

Korean Intellectual Property Office Application Serial No. 10-2007-0037208, Notice of Allowance dated Jan. 23, 2014, 2 pages.
Korean Intellectual Property Office Application Serial No. 10-2007-0037208, Office Action dated Aug. 29, 2013, 4 pages.

* cited by examiner

*Primary Examiner* — Kevin M Nguyen
*Assistant Examiner* — Cory Almeida
(74) *Attorney, Agent, or Firm* — Lee, Hong, Degerman, Kang & Waimey (57) ABSTRACT

A terminal has an input area that supports touch input, and a controller for responding to the touch input area. The controller also displays selected symbols in the touch input area responsive to an operational mode of the terminal. When the terminal is in a call mode, a command or data associated with one of the symbols displayed for the call mode may be entered by touching the symbol, touching and dragging the symbol from its original location, or touching and dragging the symbol to a central area.

15 Claims, 11 Drawing Sheets

APPARATUS AND METHOD FOR DISPLAYING SYMBOLS ON A TERMINAL INPUT AREA

Pursuant to 35 U.S.C. §119(a), this application claims the benefit of earlier filing date and right of priority to Korean Patent Application No. 10-2007-0037208 filed on Apr. 17, 2007, the contents of which are hereby incorporated by reference in their entirety.

FIELD OF THE INVENTION

This application relates to displaying symbols one a touch sensitive input area of a terminal and using the symbols to direct the control of the terminal.

DISCUSSION OF THE RELATED ART

As portable terminal include an increasing number of functions, various methods for providing data and commands to the terminal have been used. As the number of terminal functions increase, more and more input keys must be added to a keypad to provide commands required to control all the functions. As the terminals become smaller, it is more difficult to quickly locate the proper input keys for controlling the terminal functions. A more convenient way to quickly locate input keys is needed.

SUMMARY

Accordingly, the present invention is directed to a touch sensitive input area for a mobile terminal that substantially obviates one or more problems due to limitations and disadvantages of the related art.

An embodiment of the present invention provides a touch sensitive input area having a plurality of symbols for receiving input commands or data, wherein some of the symbols are visible when the terminal operates in one mode and other symbols are visible when the terminal operates in another mode. A terminal mode is when the terminal is operated for a particular purpose, for example, operating as a mobile phone for making and receiving voice communications, or operating the terminal as an MP3 or multimedia player. It is advantageous to have those symbols related to the operating mode visible to control the terminal and provide data, and symbols unrelated to the present operating mode not visible.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with a purpose of the invention, as embodied and broadly described herein, a terminal includes a touch sensitive input area and a controller configured to display in the input area a first plurality of symbols responsive to a first operating mode of the terminal and a second plurality of symbols responsive a second operating mode of the terminal. The input area has an input display configured to display the first plurality of symbols when the terminal is in the first operating mode and the second plurality of symbols when the terminal is in the second operating mode and a touchpad made of a transparent or semi-transparent material upon which the first and the second plurality of symbols are disposed.

The first operating mode is a call mode and the first plurality of symbols is arranged in circular central area and a dial-shaped peripheral area surrounding the central area and comprising at least one light emitting device configured to illuminate the first plurality of symbols. Alternatively, the terminal comprises a display located in the input area configured to display the first plurality of symbols.

The controller executes a command corresponding to a symbol when one of the plurality of first symbols is touched, is dragged from the symbol's original position, or is dragged into the central area.

In the second operating mode, when one of the second plurality of symbols is touched, the controller executes a command of the second terminal mode corresponding to the touched symbol.

In another embodiment, a method for operating a terminal, the method comprises entering one of a first operating mode and a second operating mode, displaying in a touch sensitive input area of the terminal a first plurality of symbols responsive to entering the first operating mode, and displaying in the touch sensitive input area of the terminal a second plurality of symbols responsive to entering the second operating mode.

The method further comprises detecting user contact with one symbol of the plurality of first symbols and executing a command which is associated with the one symbol.

BRIEF DESCRIPTION OF THE DRAWINGS

One or more implementations will be described in detail with reference to the following drawings in which like numerals refer to like elements.

DETAILED DESCRIPTION OF THE EMBODIMENTS

A terminal may operate in one of several modes according to the functions of the terminal. For example, a first mode of operation may be to make and receive voice communications (call mode). Other modes may be a terminal for wireless Internet communications to receive multimedia data, an MP3 player for replaying stored music files, a personal data assistant (PDA), etc.

Figure 1A:
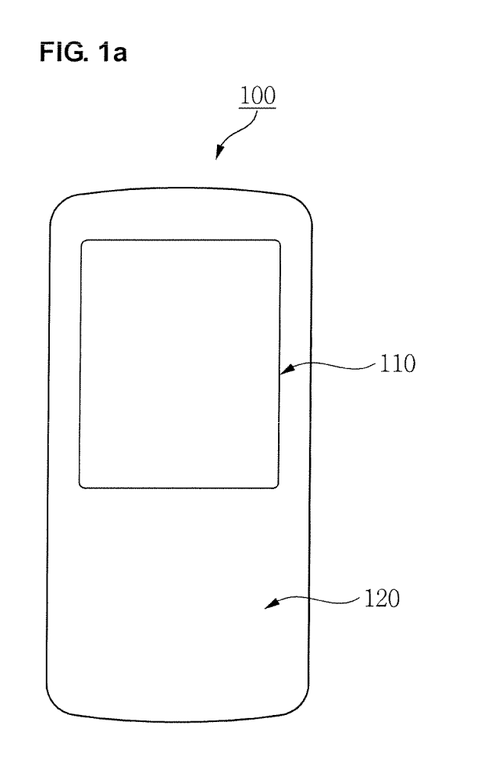
FIG. 1A to FIG. 1D illustrate different operating modes of a terminal.

FIG. 1A to FIG. 1D are front views illustrating a terminal in different modes of operation. Referring to FIG. 1A, the terminal 100 comprises a display 110 and an input area 120, which are placed on the upper and lower portions of the front side of the terminal 100, respectively.

The display 110 displays operation states of the terminal 100 or data related to the different terminal modes.

The input area 120 supports touch input. The terminal 100 may be controlled by touching the input area 120. For instance, the user can choose one of the menus displayed on the display 110 by touching the input area 120 so that the terminal 100 displays the corresponding menu.

Figure 1B:
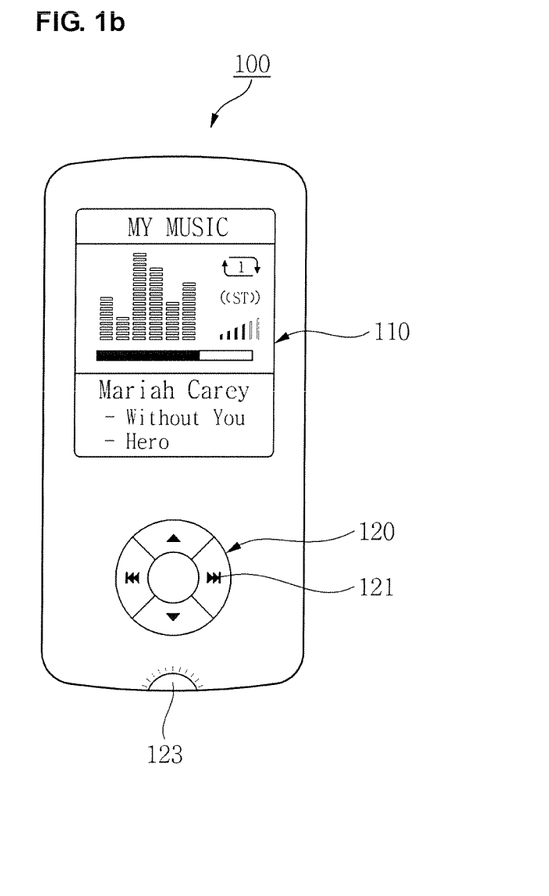

Referring to FIG. 1B, the terminal 100 enters a mode for performing a function. For example, the terminal 100 may enter a music mode to play music files. When the terminal 100 enters the music mode, symbols 121 become visible in the input area 120 from which the user can control the functions of the music mode. For example, the symbols 121 related to the music mode may be already printed on the surface of the input area 120. When the terminal 100 enters the music mode, the music symbols 121 become visible as a back light 123 turns on.

Figure 1C:
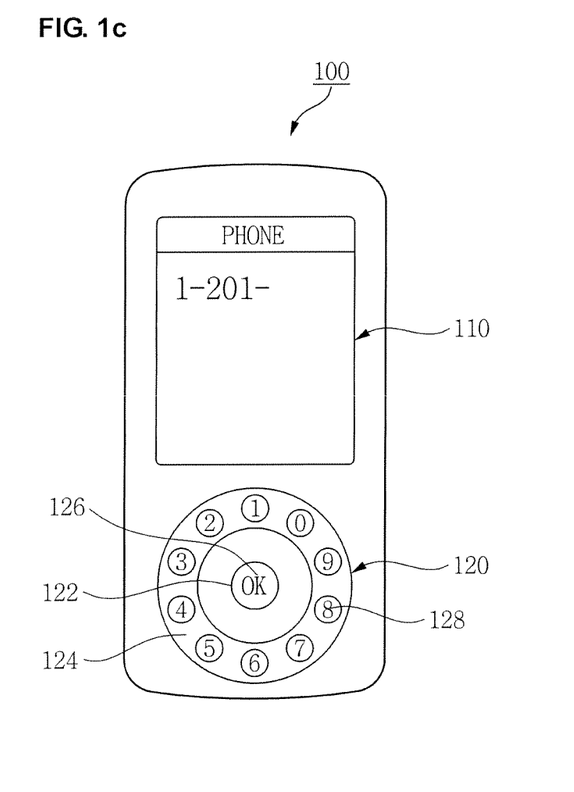

Referring to FIG. 1C, the terminal 100 enters a call mode for voice communication, for instance, to make or receive a call. When the terminal 100 enters the call mode, touch input areas 122 and 124 required for the call mode are shown. The terminal 100 controls the input area 120 to display the touch input areas 122 and 124 when the terminal 100 enters the call mode. In one embodiment, a central area 122 and a peripheral area 124 are displayed, and areas 122 and 124 may resemble a standard telephone rotary dial prevalent between the 1920s and the 1980s.

By displaying a telephone rotary dial, the user can clearly understand the operating mode of the terminal and how to input data and operate the terminal 100.

The central area 122 may operate as an execution key to carry out a selected function in the call mode. A symbol or character 126 may be displayed inside the central area 122 indicating that the central area 122 functions as an execution key. Numeral keys 128 indicating numbers for the telephone dial are displayed inside the peripheral area 124.

Figure 1D:
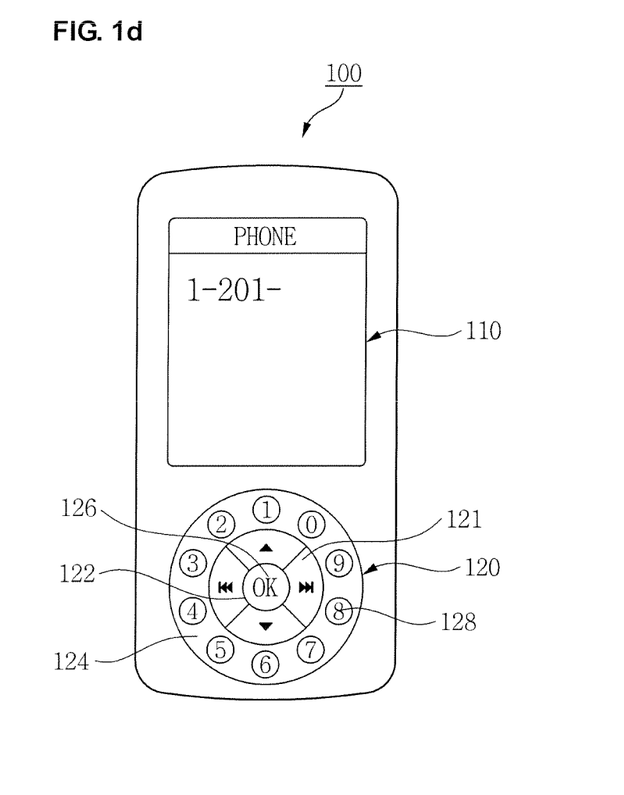

Referring to FIG. 1D, in another embodiment, the terminal 100 displays the symbols for one or more operating modes. For example, the terminal 100 may display the symbols for a music mode 121 as well as the symbols for a call mode in the touch input areas 122 and 124. The display 110 displays information related to the current operating mode.

By displaying a rotary telephone dial in the call mode, operation of the call mode is intuitive. A call may be dialed using the symbol or character 126 and the numeral keys 128 displayed in the central and peripheral areas 122 and 124.

Figure 2:
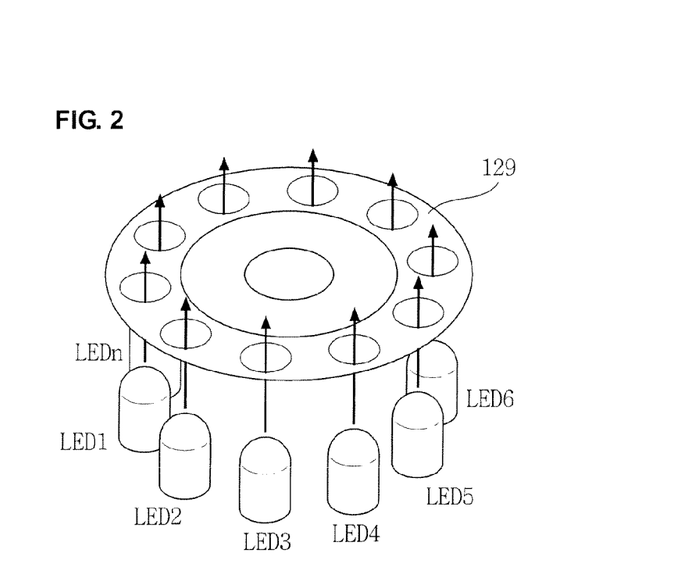
FIG. 2 shows one embodiment for illuminating the symbols of the terminal operating mode shown in FIG. 1C.

FIG. 2 is one embodiment for displaying the symbols related to the call mode in the central and peripheral areas shown in FIG. 1A to FIG. 1D. In order to display the central area 122 and the peripheral area 124 on the input 120, a plurality of LEDs is arranged within the terminal 100, and a transparent or semi-transparent film 129 is printed with areas corresponding to the central and peripheral areas 122 and 124 shown on the surface of the input area 120.

When the terminal 100 enters the call mode, the plurality of LEDs is turned on. As the plurality of LEDs emit light, the central and peripheral areas 122 and 124, which were not visible, become visible on the surface of the input 120.

Although not shown in FIG. 2, not only the areas corresponding to the central and peripheral areas 122 and 124 but also the symbol or character 126 and the numeral keys 128 displayed on the areas 122 and 124 are printed on the film 129. Therefore, when the terminal 100 enters the call mode, the symbol or character 126 and the numeral keys 128 are displayed on the central and peripheral areas 122 and 124, respectively. As a result, the user can easily recognize the call mode and the use of the input 120 in the call mode.

While this embodiment is explained with reference to the accompanying drawings, no such limitation is implied. Displaying symbols in the display area may be accomplished using backlights and LED modules, other means for displaying the symbols are possible. For example, symbols for the different operating modes may be printed on a transparent or semi-transparent film using fluorescent or phosphorescent inks responsive to a different wavelength for each operating mode. When in one operating mode, only those symbols relating to that operating mode may be made visible by tuning a backlight to that particular wavelength. Another example is to include a touch sensitive display screen in the input area and to display only those symbols relevant to the current operating mode on that touch sensitive display screen. Symbols may then be selected for data or command input by touching the touch sensitive display screen. These examples are not intended to be limiting, and other embodiments for selectively displaying symbols related to an operating mode are not precluded.

Figure 3:
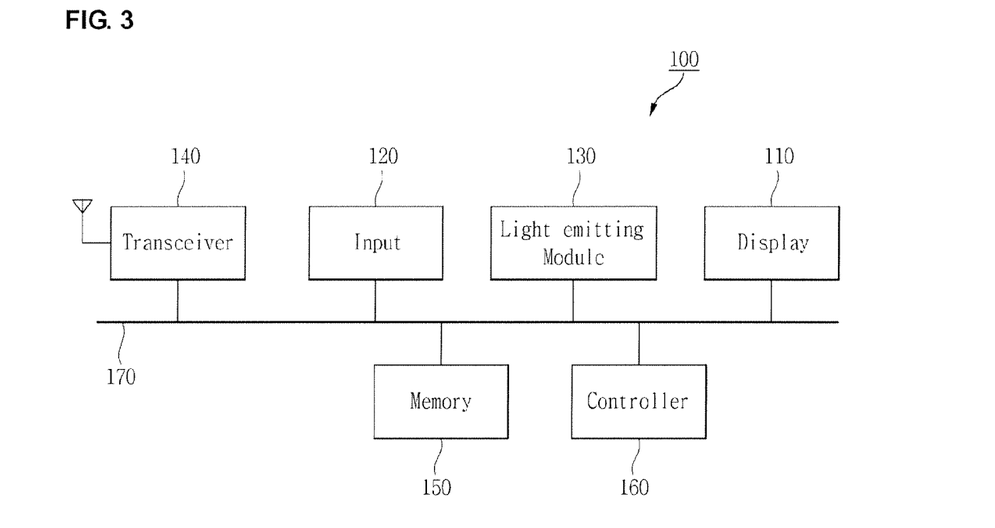
FIG. 3 is a block diagram of a mobile terminal.

FIG. 3 is a block diagram of one embodiment of a mobile terminal. The terminal 100 comprises a display 110, an input area 120, a light emitting module 130, a transceiver 140, a memory 150, and a controller 160. Each of the elements 110, 120, 130, 140, 150, and 160 of the terminal 100 may be interconnected with a bus 170, or may be interconnected without a common bus.

The display 110 may be a liquid crystal display (LCD), a plasma display panel (PDP), an organic light emitting display (OLED), etc. The display 110 displays operational functions and data according to the operating mode of the terminal 100 according to the control of the controller 160.

The input area 120 comprises a touchpad for touch input. The input 120 may further comprise a keypad with a plurality of key buttons, a navigation key with various direction keys, a jog device of which the rotation amount determines an input value, a voice input device embodied with a voice recognition device, and so on.

The light emitting module 130 comprises a backlight 123 and a plurality of LEDs as described above. The backlight 123 and the plurality of LEDs are off in an idle state before the terminal 100 enters an operating mode under the control of the controller 170. When the terminal 100 enters an operating mode, the backlight 123 and some of the LEDs are switched on according to the terminal operating mode.

The communication unit 140 transmits and receives voice signals for a voice call with another terminal, and receives multimedia data through a network. The terminal comprising such a communication unit 140 can perform various communication functions such as voice call, message transmission, web page access, data transmission/reception, telephone connection, and instant messenger service.

The memory 150 stores data and programs for the operation of the terminal 100 and is accessible by the controller 160.

The controller 160 processes and controls the operations or functions of the terminal 100. When the terminal 100 is in a normal mode, the controller 160 controls the backlight 123 to emit light from the light emitting module 130 so that the normal symbols 121 are displayed in the input area 120. When the terminal 100 enters the call mode, the controller 160 controls the LEDs to display areas 122 and 124 and special symbols 126 and 128 in the input area 120.

In addition to elements 110, 120, 130, 140, 150, and 160, the terminal 100 may further comprise at least one of a broadcast receiving module for receiving broadcast signals from a broadcast network, a communication module for communicating with a wireless internet network, a camera module, a vibration module for generating vibration, and various sensors.

Figure 4:
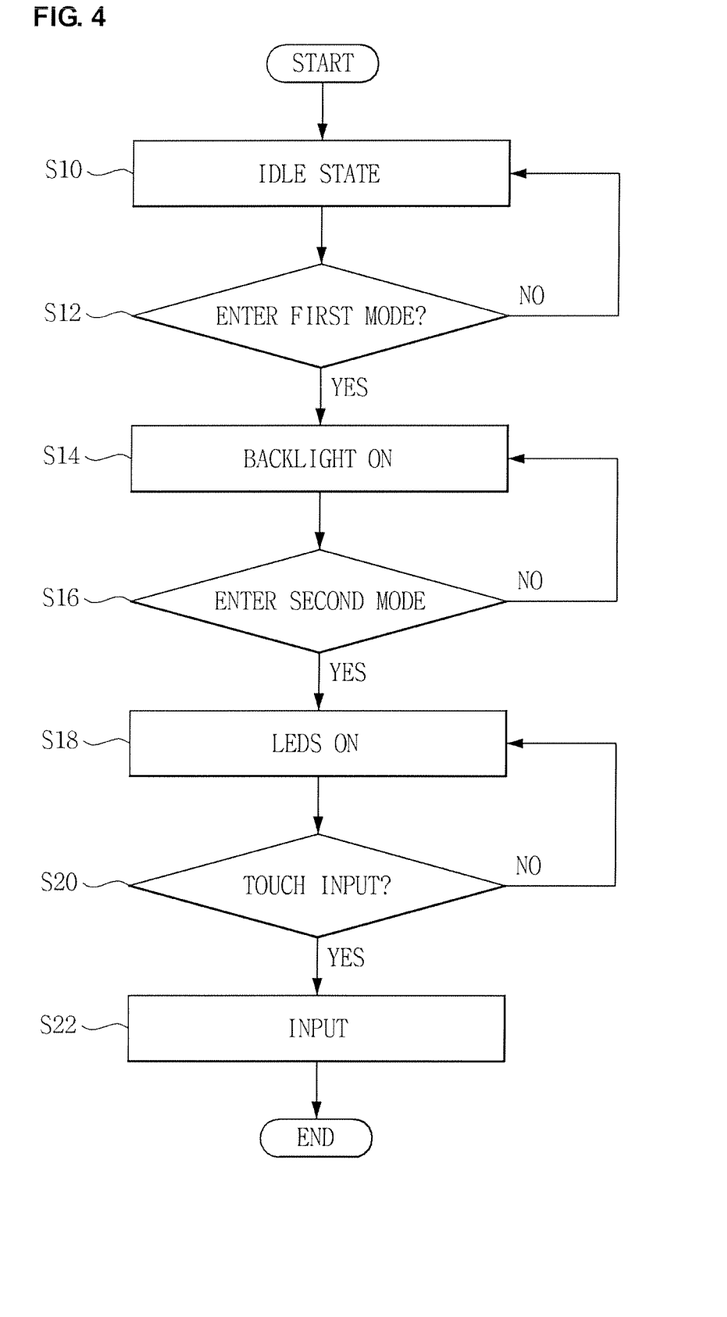
FIG. 4 is a flowchart of the operation of a terminal.

FIG. 4 is a flowchart illustrating the operation of a terminal. The terminal 100 maintains an idle state when the terminal 100 has not been used for a predetermined time period at (S10). In the idle state, the terminal 100 supplies power for only a few elements to maintain minimum functions, thereby reducing power consumption.

Upon release from the idle mode, the terminal 100 enters a first mode, for example, a music mode for playing music files (S12). The backlight 123 is then switched on (S14). By emitting light from the backlight 123, the symbols 121 associated with the first mode are visible on the surface of the input area 120. In the first mode, when one of the displayed symbols 121 is touched, the terminal 100 performs the function corresponding to the touched symbol 121. In addition, the result of the function is displayed on the screen of the display 110.

When the terminal enters a second operating mode (S16), for example a call mode, a plurality of LEDs is switched on (S18). By emitting light from the plurality of LEDs, the input areas 122 and 124 and the symbols 126 and 128 associated with the second operating mode become visible on the surface of the input area 120. If one of the symbols associated with the second operation mode is touched (S20), then the data or command associated with the touched symbol is provided to the terminal 100 (S22).

Figure 5:
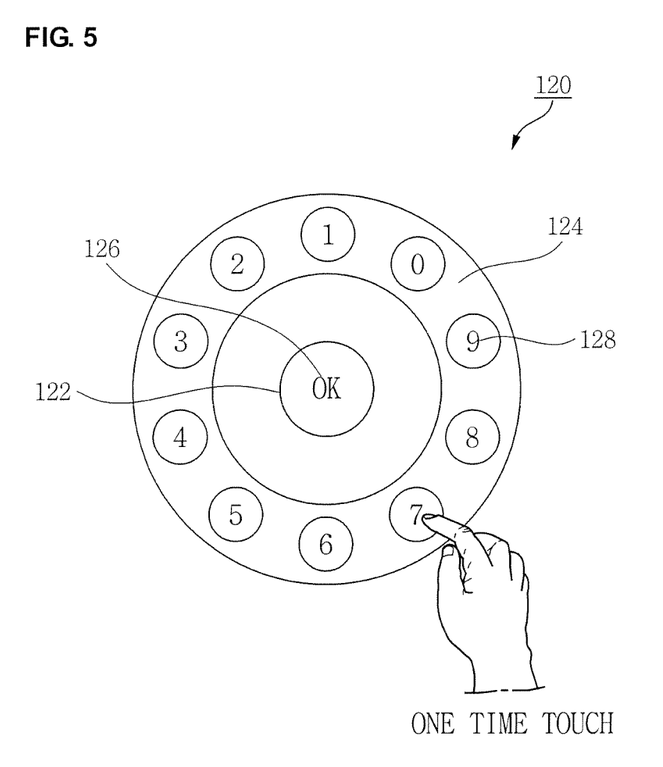
FIG. 5 illustrates controlling the terminal using a single touch.

FIG. 5 illustrates an example of touch input performed on the terminal in a call mode. FIG. 5 illustrates only the input of the terminal shown in FIG. 1C. When entering the call mode, the circular central area 122 and the dial-shaped peripheral area 124 are displayed as described above. The symbols 126 and 128 associated with the call mode are displayed on the central area 122 and the peripheral area 124 respectively.

When one of the numeral keys 128 in the peripheral area 124, for example, the number seven, is touched, the touch input through the input area 120 is transferred to the controller 126. Then, the controller 126 recognizes the touch input as the number seven of a telephone number based on a predetermined algorithm, rule, or scheme stored in the memory 125. As a result, the number 7 is displayed on the display 110.

Similarly, when another number 128 in the dial-shaped peripheral area 124 is touched, the terminal 100 operates in the same way as described above. As a result, when a telephone number is provided through area 124 of the input area 120 in the call mode, the terminal 100 attempts to place a call to the telephone number using the communication unit 140.

Figure 6:
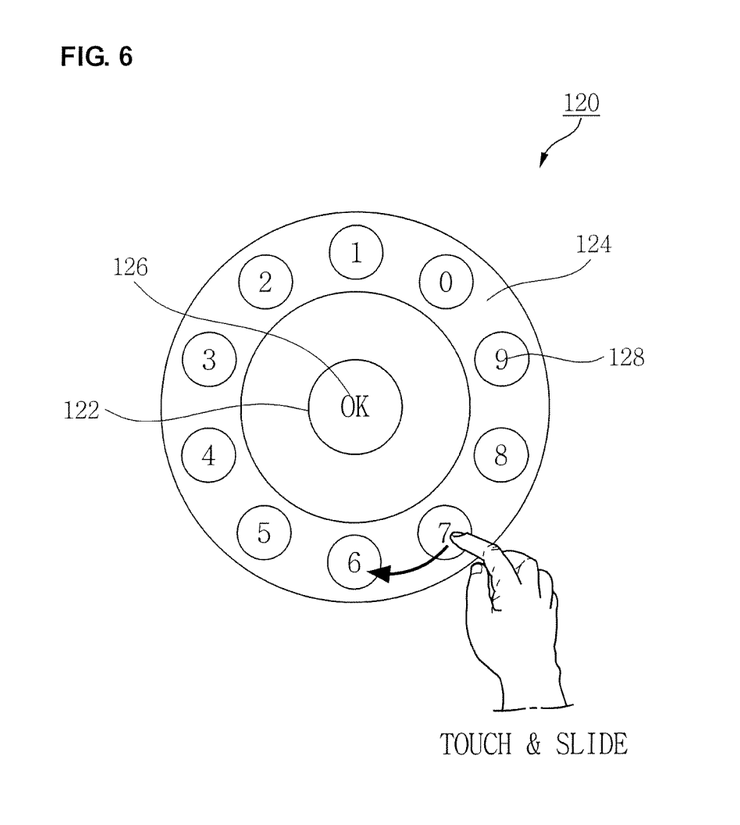
FIG. 6 illustrates another example of a touch input controlling the terminal.

FIG. 6 illustrates another embodiment of the terminal. The example shown in FIG. 6 is the same as that of FIG. 5, except for its touch input scheme. When one of the numeral keys 128 in the peripheral area 124, for example the number seven, is touched and then moved, the touch input is recognized by the controller 126. The controller 126 recognizes the touch input as the number seven of a telephone number and the result is displayed on the display 110.

When a number is touched and moved from its original position, or to a specific area, for example the number zero in the peripheral area 124, the touched number will be provided to the controller 126. Such a touch and move scheme can prevent an erroneous input to the terminal 100 from an unintentional touch. Such a scheme is similar in operation to that of a conventional rotary telephone dial.

Figure 7:
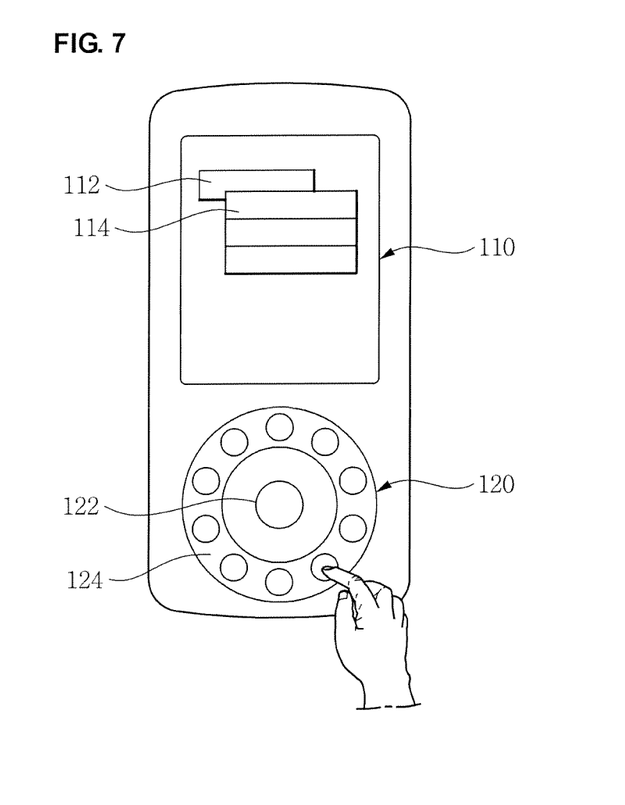
FIG. 7 illustrates a touch input controlling menus on a terminal display screen.

FIG. 7 illustrates another embodiment of the invention in a terminal. If each of the symbols in the peripheral area 124 matches a respective menu, such as a multimedia playing menu, text messaging menu, and a video call menu, when the peripheral area 124 is touched, the controller 160 controls the input 120 so as to display the sub-menus 114 of the menu 112 corresponding to the touched peripheral area on the screen of display 110.

While the sub-menus 114 are displayed on the display 110, the controller 160 controls the input 120 and display 110 so as to match the peripheral area 124 with the sub-menus 114, respectively. Accordingly, when the sub-menus are displayed on the display 110 and the peripheral area 124 is touched, the sub-menu corresponding to the touch is performed.

Figure 8:
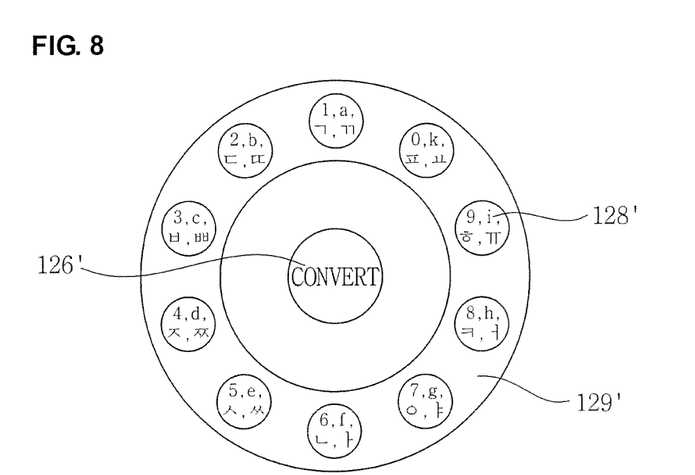
FIG. 8 is an example of one plurality of symbols.

FIG. 8 illustrates a film used for one embodiment. The film 129' corresponds to the central and peripheral areas 122 and 124 displayed on the surface of the input area 120 and is printed with symbol groups 126' and 128' that are displayed within the central and peripheral areas 122 and 124. In this case, each of the symbol groups 128' in the peripheral area 124 comprises a plurality of symbols such as a numeral and several letters.

The special symbol 126' in the central area indicates that when touched, will allow one of the plurality of symbols in one of the symbol groups 128' to be entered for placing a telephone call, menu selection, or inputting a text message.

Referring again to FIG. 1C and FIG. 8, when the terminal 100 enters the call mode, all the symbol groups 128' printed within the peripheral area 124 on the film 129' shown in FIG. 8 are visible in the input area 120 at the same time, or only the symbols corresponding to the call mode are visible.

As the plurality of LEDs in FIG. 2 illuminate the entire peripheral area 124, all the symbols of each symbols group are displayed on the surface of the input area 120. On the other hand, selectively illuminating some of the plurality of LEDs displays one of the symbols in each of the symbol groups 128' according to contact with the central area 126'.

Alternatively, each of the symbols of the symbol groups 128' may be printed with different fluorescent or phosphorous materials on the film 129', and each of the symbols becomes visible when illuminated with different wavelength light. Therefore, by varying the wavelength of the light of the LEDs, the different symbols of the symbol groups become visible.

As described above, the number or kind of the special symbols 128 in the peripheral area 124 may vary. Also, a method for displaying various symbols 128 on the surface of the input area 120 may vary. The central area 122 is also similar to the peripheral area 124 in this sense.

Figure 9:
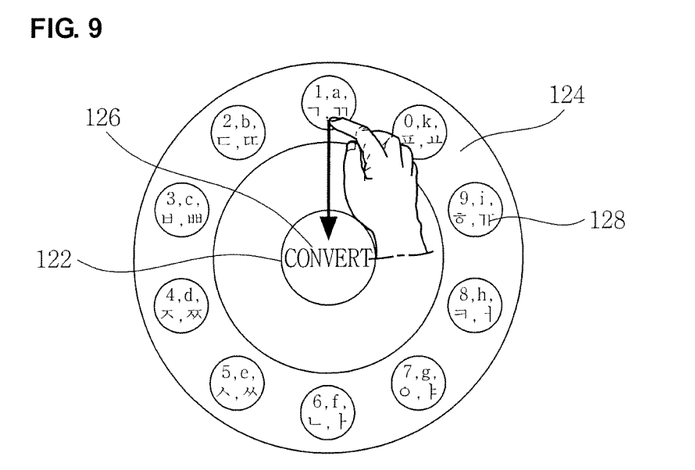
FIG. 9 illustrates another example of a touch input controlling the terminal using the symbols shown in FIG. 8.

FIG. 9 is illustrates another example of a touch input performed on the terminal comprising the input shown in FIG. 8. An input mode can be changed by a touch input on the central area 122, as described above. When the input mode is changed, the user may input one of the characters displayed on the peripheral area 124 by touching, moving, and then dropping the character into the central area 122.

Then, the controller 126 recognizes the character touched, moved, and dropped into the central area 122 as an input and the result is displayed on the display 110. Such a touch, move and drop scheme prevents the terminal 100 from responding to an unintentional touch.

Figure 10:
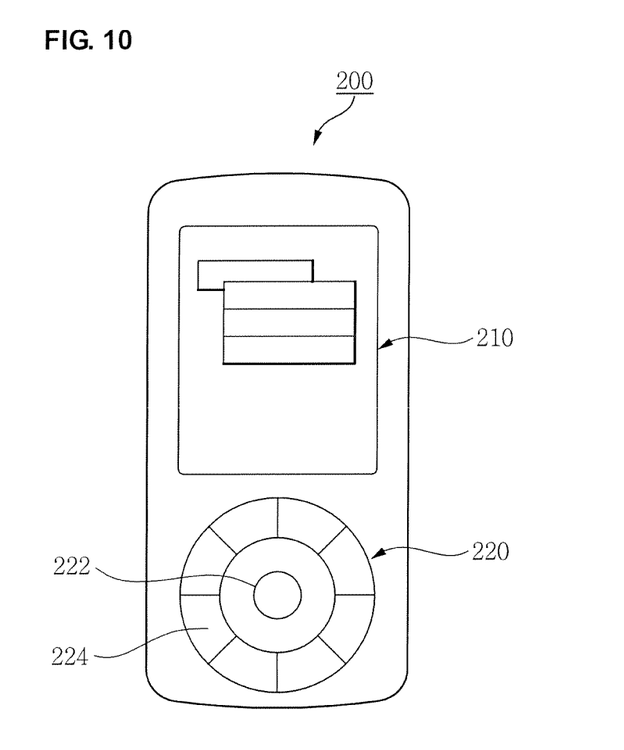
FIG. 10 is a front view of a terminal showing another embodiment.

FIG. 10 illustrates a terminal having another embodiment of the invention. The terminal shown in FIG. 10 is the same as that of FIG. 1C in that specific areas available for touch input are displayed on the surface of the input in a call mode, but the shapes of the touch input areas in the terminals are different from each other.

The terminal 200 comprises a display 210 and an input area 220. The input area 220 maintains the same state as shown in FIG. 1A and FIG. 1B before the terminal 200 enters the call mode. When the terminal 200 enters the call mode, the central and peripheral areas 222 and 224 that are available for touch input are visible on the surface of the input area 220. The visible area is located in the outside of boundary of concentric circle. Here, while the central area 222 has the same shape as that of FIG. 1C, the peripheral area 224 has a different shape from that of FIG. 1C, which is defined as an annular area having radial dividing lines. As not shown in FIG. 10, symbols related to the call mode may be displayed in the central and peripheral areas 222 and 224.

The central area 222 may operate as a function key to change functions or modes or to execute a selected function or menu. Each of the divided areas in peripheral area 224 may match with sub-menus related to the operating mode. For example, the central area 222 may operate as a key to input at least one function, such as voice call, application execution, character or symbol input. The user also can input a command to select a symbol from the symbol groups of the peripheral area 224 by touching the central area 222.

Although the implementations have been explained with reference to the drawings, the present invention is not limited thereto.

As described above, a first mode may be a call mode, and that in the call mode, central and peripheral areas may be circular and dial-shaped, respectively. In fact, a first mode may be a message transmission mode, wireless Internet mode, or the like. Here, the central and peripheral areas may have another shape which is designed to be suitable for the feature of the first mode. A user can intuitively recognize the feature and input scheme of the first mode through the central and peripheral areas designed for the first mode. Here, the central area may be a function key to change modes or to execute the first mode. The symbols printed within the central and peripheral areas may be designed to be suitable for the features of the first mode. As described above, the terminal and the display method provide various input schemes.

The embodiments have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A terminal, comprising: a touch sensitive input area comprising a surface and a film covering the surface, wherein the film is transparent or semi-transparent and comprises a first pattern including a first plurality of symbols and a first plurality of dividing lines printed on the film, and wherein the surface comprises a second pattern including a second plurality of symbols and a second plurality of dividing lines printed on the surface, the second pattern having a different shape than the first pattern; a light emitting module comprising a backlight and a plurality of light emitting devices (LEDs) that are configured to be selectively turned on and off according to an operating mode of the terminal; and a controller configured to: control the backlight to be turned off and the plurality of LEDs to be turned on such that the first pattern becomes visible when the terminal is in a first operating mode; perform a specific function corresponding to at least one of the first plurality of symbols in response to a first touch input received on the touch sensitive input area during the first operating mode; control the backlight to be turned on and the plurality of LEDs to be turned off such that the second pattern becomes visible when the terminal is in a second operating mode; and perform a specific function corresponding to at least one of the second plurality of symbols in response to a second touch input received on the touch sensitive input area during the second operating mode, wherein the backlight and the plurality of LEDs are off in an idle state prior to entering the first operating mode or the second operating mode such that none of the first pattern and the second pattern is visible during the idle state.

2. The terminal of claim 1, wherein:
the first operating mode is a call mode; and
the first plurality of symbols is arranged in a circular central area and a dial-shaped peripheral area surrounding the central area.

3. The terminal of claim 2, wherein the first touch input is a touch and drag input of a symbol of the first plurality of symbols from a first position of the touch sensitive input area to a second position of the touch sensitive input area.

4. The terminal of claim 2, wherein the first touch input is a touch and drag input of a symbol of the first plurality of symbols from the peripheral area into the circular central area.

5. The terminal of claim 1, wherein an area of the film on which each of the first plurality of symbols is printed is unrelated to an area of the surface on which each of the second plurality of symbols is printed.

6. The terminal of claim 1, wherein:
the first pattern is an annular shape having a circular central area and a dial-shaped peripheral area surrounding the circular central area; and
the second pattern is an annular shape and the second plurality of dividing lines are radial dividing lines.

7. A method for operating a terminal, the method comprising:
controlling, via a controller of the terminal, a light emitting module comprising a backlight and a plurality of light emitting devices (LEDs) to selectively turn on and off the backlight and the plurality of LEDs according to an operating mode of the terminal;
controlling, via the controller, the plurality of LEDs to illuminate a touch sensitive input area such that a first pattern becomes visible on a film of the touch sensitive input area when the terminal enters a first operating mode, the first pattern comprising a first plurality of symbols and a first plurality of dividing lines printed on the film;
performing a specific function corresponding to at least one of the first plurality of symbols in response to a first touch input received on the touch sensitive input area during the first operating mode;
controlling, via the controller, the backlight to illuminate the touch sensitive input area such that a second pattern becomes visible on a surface of the touch sensitive input area when the terminal enters a second operating mode, the second pattern comprising a second plurality of symbols and a second plurality of dividing lines printed on the surface; and
performing a specific function corresponding to at least one of the second plurality of symbols in response to a second touch input received on the touch sensitive input area during the second operating mode,
wherein the backlight and the plurality of LEDs are off in an idle state prior to entering the first operating mode or the second operating mode such that none of the first pattern and the second pattern is visible during the idle state,
wherein the touch sensitive input area comprises the surface and the film,
wherein the film covers the surface,
wherein the film is transparent or semi-transparent, and wherein the first plurality of symbols is related to the first operating mode and the second plurality of symbols is related to the second operating mode.

8. The method of claim 7, wherein:
the first operating mode is a call mode; and
the first plurality of symbols is arranged in a circular central area and a dial-shaped peripheral area surrounding the central area.

9. The method of claim 8, wherein the first plurality of symbols comprise consecutive numbers.

10. The method of claim 8, further comprising switching between the first operating mode and the second operating mode in response to input received via the circular central area.

11. The method of claim 8, further comprising:
performing a function in response to input received via the circular central area,
wherein the function comprises initiating a voice call, executing an application, or inputting a symbol.

12. The method of claim 8, wherein
the first input comprises a dragging of a touched symbol from the dial-shaped peripheral area.

13. The method of claim 7, wherein the first touch input comprises a touch to the at least one of the first plurality of symbols.

14. The method of claim 13, wherein the first touch input further comprises a dragging of the at least one of the first plurality of symbols from a first position of the touch sensitive input area to a second position of the touch sensitive input area.

15. The method of claim 7, further comprising:
selectively illuminating individual LEDs of the plurality of LEDs,
wherein symbols of the plurality of symbols of the first pattern that are illuminated is based on the selective illumination of the individual LEDs such that the illuminated symbols become visible.

* * * * *